United States Patent
Galati

(10) Patent No.: US 11,186,021 B2
(45) Date of Patent: Nov. 30, 2021

(54) ADJUSTED CAVITY INJECTION FLUID PRESSURES IN INJECTION MOLDING SYSTEM

(71) Applicant: Synventive Molding Solutions, Inc., Peabody, MA (US)

(72) Inventor: Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 417 days.

(21) Appl. No.: 16/067,028

(22) PCT Filed: Dec. 9, 2016

(86) PCT No.: PCT/US2016/065832
§ 371 (c)(1),
(2) Date: Jun. 28, 2018

(87) PCT Pub. No.: WO2017/100575
PCT Pub. Date: Jun. 15, 2017

(65) Prior Publication Data
US 2019/0009445 A1 Jan. 10, 2019

Related U.S. Application Data

(60) Provisional application No. 62/265,098, filed on Dec. 9, 2015.

(51) Int. Cl.
*B29C 45/77* (2006.01)
*B29C 45/76* (2006.01)
(Continued)

(52) U.S. Cl.
CPC .............. *B29C 45/77* (2013.01); *B29C 45/03* (2013.01); *B29C 45/2806* (2013.01);
(Continued)

(58) Field of Classification Search
None
See application file for complete search history.

(56) References Cited

U.S. PATENT DOCUMENTS 3,893,792 A * 7/1975 Laczko ................ B29C 45/768
425/149
3,920,367 A * 11/1975 Ma ......................... B29C 45/77
425/149
(Continued)

FOREIGN PATENT DOCUMENTS

WO 2012/074879 A1 6/2012
WO 2014/153330 A1 9/2014
(Continued)

OTHER PUBLICATIONS

Translation of WO 2014/182187 (Year: 2014).*
(Continued)

*Primary Examiner* — Marc C Howell
*Assistant Examiner* — John J DeRusso
(74) *Attorney, Agent, or Firm* — Polsinelli, P.C.

(57) ABSTRACT

An injection molding system (10) and method of use where the system (10) is comprised of an injection molding system (10),
  a controller (16) for controlling pack or fill pressures of the injection fluid injected during the pack and fill phases,
  a recorder,
  the controller including instructions that controls drive of actuators (1*a*, 2*a*, 3*a*, 4*a*) to effect an increase or decrease in fill and pack pressures of the injection fluid.

14 Claims, 8 Drawing Sheets

(51) Int. Cl.
*B29C 45/03* (2006.01)
*B29C 45/28* (2006.01)

(52) U.S. Cl.
CPC .......... *B29C 45/76* (2013.01); *B29C 45/766* (2013.01); *B29C 45/7686* (2013.01); *B29C 2045/2872* (2013.01); *B29C 2945/76006* (2013.01); *B29C 2945/76498* (2013.01); *B29C 2945/76648* (2013.01); *B29C 2945/76936* (2013.01)

(56) References Cited

U.S. PATENT DOCUMENTS

| 4,060,362 | A | * | 11/1977 | Wilson, III | B29C 45/76 425/145 |
| 5,556,582 | A | * | 9/1996 | Kazmer | B29C 45/0025 264/40.1 |

FOREIGN PATENT DOCUMENTS

| WO | WO-2014182187 A1 | * | 11/2014 | ............. B29C 45/76 |
| WO | 2015/066004 A1 | | 5/2015 | |

OTHER PUBLICATIONS

International Search Report and Written Opinion in related International Application No. PCT/US2016/065611 dated Jun. 15, 2017.
International Preliminary Report on Patentability in related International Application No. PCT/US2016/065611 dated Jun. 12, 2018.
International Search Report and Written Opinion in corresponding International Application No. PCT/US2016/065832 dated Jun. 15, 2017.
International Preliminary Report on Patentability in corresponding International Application No. PCT/US2016/065832 dated Jun. 12, 2018.
Kazmer, D., et al, "Multi-Cavity Pressure Control int eh Filling and Packing Stages of the Injection Molding Process", Polymer Engineering and Science, Brookfield Center, US, vol. 37, No. 11, Nov. 1, 1997, pp. 1865-1879.
Kazmer, David et al., "Multi-Cavity Pressure Control in the Filling and Packing Stages of the Injection Molding Process", Polymer Engineering and Science, Nov. 1997, vol. 37, No. 11.
International Preliminary Report on Patentability in corresponding Application No. PCT/US2016/065832 dated Jun. 21, 2018.
International Search Report and Written Opinion in corresponding Application No. PCT/US2016/065832 dated Mar. 17, 22017.
International Preliminary Report on Patentability in Application No. PCT/US2016/065611 dated Jun. 21, 2018.
International Search Report and Written Opinion in Application No. PCT/US2016/065611 dated Mar. 30, 2017.

* cited by examiner

|  |  | N1 | | N2 | | N3 | | N4 | |
| --- | --- | --- | --- | --- | --- | --- | --- | --- | --- |
|  |  | Target | Actual | Target | Actual | Target | Actual | Target | Actual |
| Cycle 1 | | | | | | | | | |
| | Fill Pressure | 1000 | 1100 | 500 | 600 | 500 | 600 | 1000 | 1100 |
| | Pack Pressure | 700 | 600 | 700 | 600 | 350 | 300 | 700 | 600 |
| Cycle 2 | | | | | | | | | |
| | Fill Pressure | 1000 | 900 | 500 | 400 | 500 | 400 | 1000 | 900 |
| | Pack Pressure | 700 | 650 | 700 | 650 | 350 | 325 | 700 | 650 |
| Cycle 3 | | | | | | | | | |
| | Fill Pressure | 1000 | 950 | 500 | 500 | 500 | 500 | 1000 | 950 |
| | Pack Pressure | 700 | 700 | 700 | 700 | 350 | 350 | 700 | 700 |
| Cycle 4 | | | | | | | | | |
| | Fill Pressure | 1000 | 1000 | 500 | 500 | 500 | 500 | 1000 | 1000 |
| | Pack Pressure | 700 | 700 | 700 | 700 | 350 | 350 | 700 | 700 |

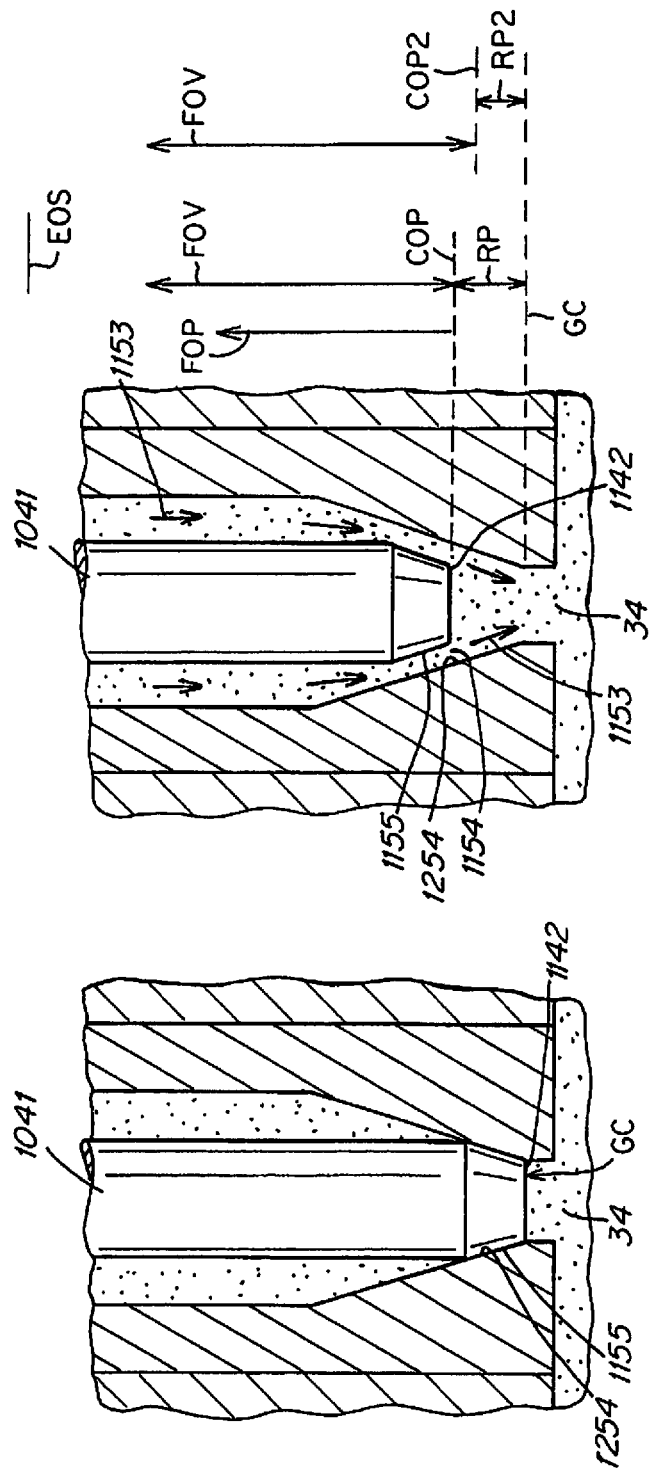

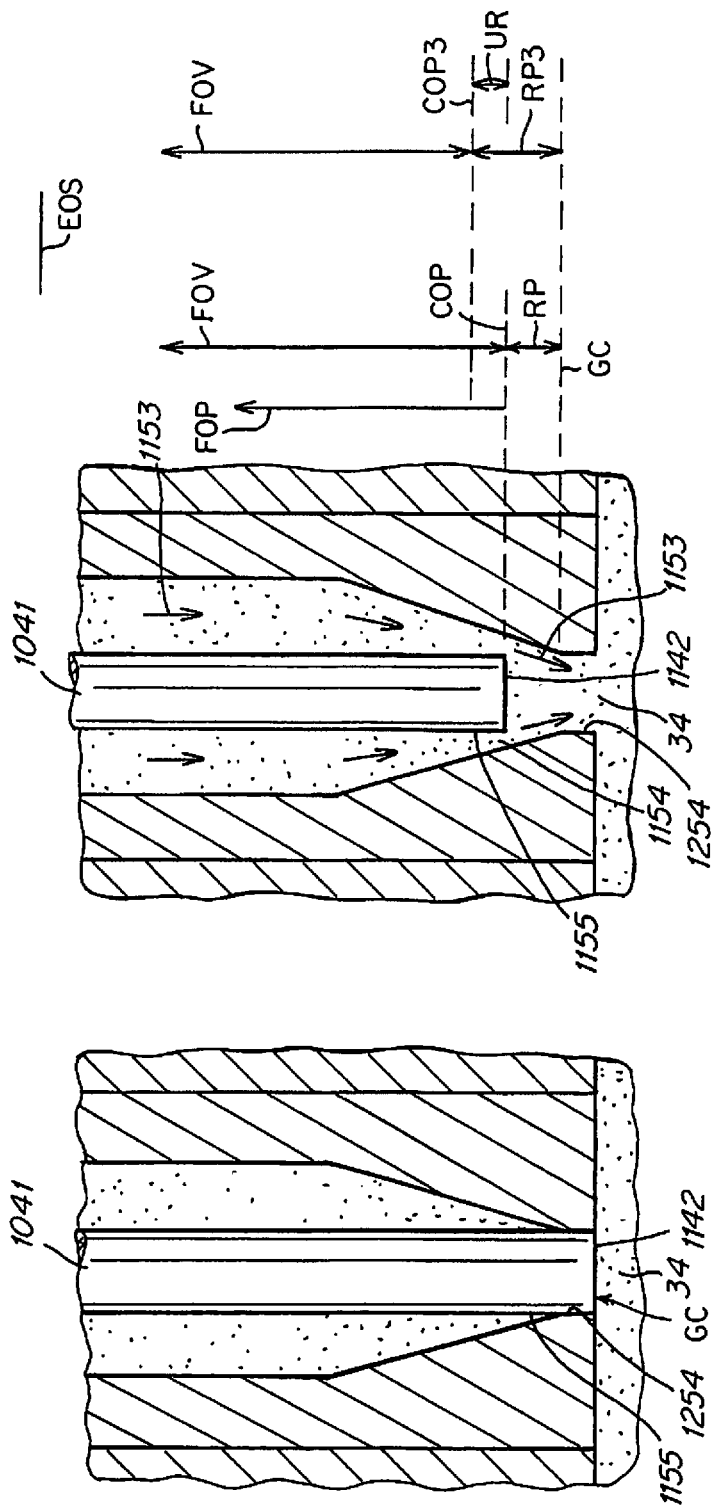

ADJUSTED CAVITY INJECTION FLUID PRESSURES IN INJECTION MOLDING SYSTEM

RELATED APPLICATIONS

This application is a 371 of PCT/US2016/065832 filed Dec. 9, 2016 which claims the benefit of priority to U.S. Provisional Application Ser. No. 62/265,098 filed Dec. 9, 2015, the disclosures of which are incorporated by reference in its entirety as if fully set forth herein.

This application is a continuation-in-part of and claims the benefit of priority to U.S. application Ser. No. 14/243,277 filed Apr. 2, 2014, the disclosure of which is incorporated by reference as if fully set forth in its entirety herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070) and PCT application no. PCT/US2011/029721 filed Mar. 24, 2011 (7094), PCT publication no. WO2012074879 (A1) (7100WO0) and WO2012087491 (A1) (7100WO1) and PCT/US2013/75064 (7129WO0) and PCT/US2014/19210 (7129WO1) and PCT/US2014/31000 (7129WO2).

BACKGROUND OF THE INVENTION

Injection molding systems that control pin position during the course of an injection cycle have been developed where the position of the pin is dynamically controlled in a closed loop in real time to follow a predetermined profile of pin positions based on a comparison of the pin position with a predetermined profile of pin positions. In systems where multiple nozzles are used to simultaneously inject fluid material to either multiple separate cavities or into a single cavity, prior systems rely on a single predetermined set of pin position data to control the rate of flow of injection fluid material into each separate cavity or otherwise through each separate gate leading to a single cavity.

SUMMARY OF THE INVENTION

In accordance with the invention there is provided in an injection molding system (10) comprised of an injection molding machine (40), a heated manifold (50) into which the injection molding machine injects a selected injection fluid (1153), a plurality of nozzles (1n, 2n, 3n, 4n) receiving injection fluid (1153) from the heated manifold (50), the nozzles each having a respective gate (1g, 2g, 3g, 4g) communicating with one or more cavities (20), each nozzle having a valve comprised of an actuator (1a, 2a, 3a, 4a) and a corresponding valve pin (1p, 2p, 3p, 4p) controllably driven by the actuator to control velocity or pressure of injection fluid flow (1153) through the gates of the nozzles during an injection cycle having a selected duration, the injection cycle comprising a fill phase wherein between about 90% and about 99% of the mold cavity is filled with injection fluid and a subsequent pack phase wherein between about 1% and about 10% of the mold cavity is filled with injection fluid, a method for establishing pack or fill pressures of the injection fluid injected during the pack and fill phases at preselected positions within the cavity (20) of the mold (35), the method comprising:

selecting a target fill and pack pressure at each of the preselected positions, injecting injection fluid (1153) on a first injection cycle through each of the gates (1g, 2g, 3g, 4g) of each of the nozzles (1n, 2n, 3n, 4n) with the corresponding valve pins (1p, 2p, 3p, 4p) each being positioned at corresponding first selected axial positions relative to each of the gates, recording one or both of the pack and fill pressures at each of the selected positions within the one or more mold cavities during the first injection cycle, establishing second axial positions for each of the valve pins (1p, 2p, 3p, 4p) relative to each of the respective gates (1g, 2g, 3g, 4g) that are determined according to an algorithm that determines an adjustment in the axial positioning of each of the valve pins relative to their respective gates that will effect an increase or decrease in the fill and pack pressures relative to the recorded fill and pack pressures that more closely approaches the selected target fill and pack pressures, injecting injection fluid (1153) on a successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the second axial positions for each of the valve pin that are determined according to the algorithm such that pressure or velocity of flow of injection fluid through the gates is adjusted to more closely approach the target fill and pack pressures for each of the selected positions within the one or more mold cavities (20).

The algorithm preferably determines the adjustment in axial positioning of the valve pins according to a program that increases or decreases the fill and pack pressures to a preselected degree of increase or decrease.

Typically at least the steps of establishing and injecting are controlled and executed automatically by a programmable controller that contains instructions for executing the algorithm.

Such a method can further comprise:

recording one or both of the pack and fill pressures at each of the selected positions within the one or more mold cavities during the last or latest conducted injection cycle, establishing one or more additional selected axial positions for each of the valve pins (1p, 2p, 3p, 4p) relative to each of the respective gates (1g, 2g, 3g, 4g) that are determined according to the algorithm that determines an adjustment in the axial positioning of each of the valve pins relative to their respective gates that will effect an increase or decrease in the fill and pack pressures relative to the last or latest recorded fill and pack pressures that more closely approaches the selected target fill and pack pressures, injecting injection fluid (1153) on another successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the one or more additional selected axial positions for each of the valve pin that are determined according to the algorithm such that pressure or velocity of flow of injection fluid through the gates is again adjusted to more closely approach the target fill and pack pressures for each of the selected positions within the one or more mold cavities (20), repeating the steps of recording, establishing and injecting until the selected target pressures are achieved.

In such a method, the actuators, valve pins and gates are preferably adapted such that the valve pins are controllably drivable between a gate closed position at which injection fluid flow is stopped and pressure is zero at the gate, a fully upstream gate open position at which injection fluid flow is at a maximum velocity and pressure and one or more intermediate upstream positions between the gate closed and fully upstream gate open position at which injection fluid flow pressure and velocity is at a reduced between zero and the maximum, the pressure or velocity of injection fluid flow through the gates being adjusted during one or more of the successive injection cycles by controlling positioning of a distal end of one or more valve pins relative to an interior surface of a corresponding gate to controllably reduce velocity of flow of the injection fluid to one or more reduced velocities between zero and the maximum velocity. one or more of the valve pins is withdrawn and maintained in at least one selected intermediate upstream position for a selected portion or all of the duration of the injection cycle.

One or more of the valve pins is typically withdrawn and maintained in at least one selected intermediate upstream position for a selected portion or all of the fill and pack phases of the injection cycle.

In another aspect of the invention there is provided an apparatus for adjusting the rate of injection fluid flow comprising an injection molding system (10) comprised of an injection molding machine (40), a heated manifold (50) into which the injection molding machine injects a selected injection fluid (1153), a plurality of nozzles (1n, 2n, 3n, 4n) receiving injection fluid (1153) from the heated manifold (50), the nozzles each having a respective gate (1g, 2g, 3g, 4g) communicating with one or more cavities (20), each nozzle having a valve comprised of an actuator (1a, 2a, 3a, 4a) and a corresponding valve pin (1p, 2p, 3p, 4p) controllably driven by the actuator to control velocity or pressure of injection fluid flow (1153) through the gates of the nozzles during an injection cycle having a selected duration, the injection cycle comprising a fill phase wherein between about 90% and about 99% of the mold cavity is filled with injection fluid and a subsequent pack phase wherein between about 1% and about 10% of the mold cavity is filled with injection fluid, a controller for controlling pack or fill pressures of the injection fluid injected during the pack and fill phases at preselected positions within the cavity (20) of the mold (35), the controller the injection machine molding machine injecting injection fluid (1153) on a first injection cycle through each of the gates (1g, 2g, 3g, 4g) of each of the nozzles (1n, 2n, 3n, 4n) with the valve pins (1p, 2p, 3p, 4p) being driven to first cycle axial positions relative to their respective gates (1g, 2g, 3g, 4g) that results in a first cycle of pack and fill pressures at each of the selected positions within the one or more mold cavities, a recorder that records the first cycle of fill and pack pressures at each of the selected positions within the one or more mold cavities, the controller including instructions that controls drive of the actuators (1a, 2a, 3a, 4a) corresponding to each gate (1g, 2g, 3g, 4g) to drive their corresponding valve pins during a second injection cycle to second cycle axial positions relative to each of their respective gates (1g, 2g, 3g, 4g) that are determined according to an algorithm executed by the controller that determines an adjustment in the axial positioning of each of the valve pins relative to their respective gates that will effect an increase or decrease in the fill and pack pressures relative to the recorded first cycle of fill and pack pressures that more closely approaches the selected target fill and pack pressures, the controller including instructions that instruct operation of the injection molding machine to inject injection fluid (1153) on the second injection cycle through each of the gates and control the actuators (1a, 2a, 3a, 4a) corresponding to each gate (1g, 2g, 3g, 4g) to adjust positioning of the valve pins (1p, 2p, 3p, 4p) to the second cycle axial positions for each of the valve pins.

In such an apparatus the algorithm preferably determines the adjustment in axial positioning of the valve pins according to a program that increases or decreases the fill and pack pressures to a preselected degree of increase or decrease.

In such an apparatus the controller preferably includes instructions that:

record one or both of the pack and fill pressures at each of the selected positions within the one or more mold cavities during the last or latest conducted injection cycle, establishes one or more additional selected axial positions for each of the valve pins (1p, 2p, 3p, 4p) relative to each of the respective gates (1g, 2g, 3g, 4g) that are determined according to the algorithm that determines an adjustment in the axial positioning of each of the valve pins relative to their respective gates that will effect an increase or decrease in the fill and pack pressures relative to the last or latest recorded fill and pack pressures that more closely approaches the selected target fill and pack pressures, injects injection fluid (1153) on another successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the one or more additional selected axial positions for each of the valve pin that are determined according to the algorithm such that pressure or velocity of flow of injection fluid through the gates is again adjusted to more closely approach the target fill and pack pressures for each of the selected positions within the one or more mold cavities (20), repeats the steps of recording, establishing and injecting until the selected target pressures are achieved.

In such an apparatus the actuators, valve pins and gates are adapted such that the valve pins are controllably drivable between a gate closed position at which injection fluid flow is stopped and pressure is zero at the gate, a fully upstream gate open position at which injection fluid flow is at a maximum velocity and pressure and one or more intermediate upstream positions between the gate closed and fully upstream gate open position at which injection fluid flow pressure and velocity is at a reduced between zero and the maximum, the pressure or velocity of injection fluid flow through the gates being adjusted during one or more of the successive injection cycles by controlling positioning of a distal end of one or more valve pins relative to an interior surface of a corresponding gate to controllably reduce velocity of flow of the injection fluid to one or more reduced velocities between zero and the maximum velocity.

One or more of the valve pins is typically withdrawn and maintained in at least one selected intermediate upstream position for a selected portion or all of the duration of the injection cycle.

One or more of the valve pins is typically withdrawn and maintained in at least one selected intermediate upstream position for a selected portion or all of the fill and pack phases of the injection cycle.

BRIEF DESCRIPTION OF THE DRAWINGS

The above and further advantages of the invention may be better understood by referring to the following description in conjunction with the accompanying drawings in which:

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum.

FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum.

DETAILED DESCRIPTION

Figure 1:
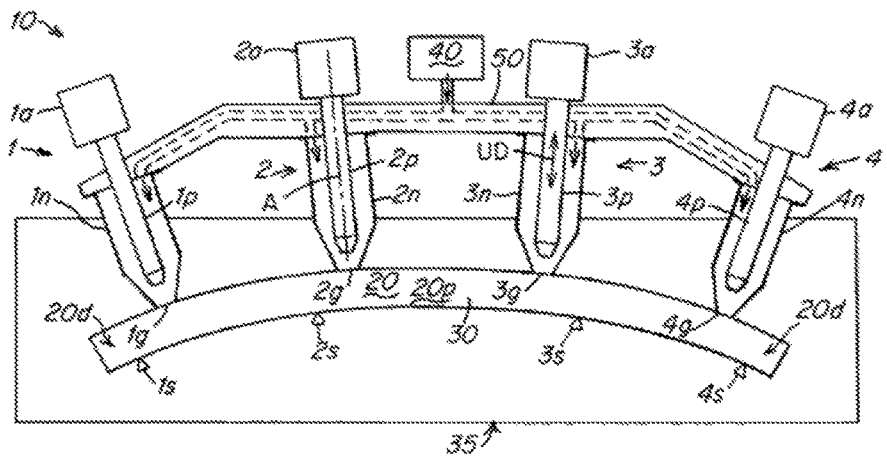
FIG. 1 is a schematic of an embodiment of the invention showing a single mold cavity having multiple valves with multiple gates injecting injection fluid into the cavity of a mold at a variety of spaced apart positions along the length, width and contour of the mold and mold cavity, and illustrating an example of fill and pack pressure data recorded during the course of a first and subsequent second, third and fourth injection cycles Cycle 1, Cycle 2, Cycle 3, Cycle 4, by cavity sensors disposed at selected positions within the volume of the cavity relative to each gate of each valve.

FIG. 1 shows an injection molding system 10 according to the invention comprised of an injection molding machine 40 that injects a preselected injection molding fluid into a heated fluid distribution manifold 50 that distributes heated injection fluid to a plurality of valves 1, 2, 3, 4 each comprised of a respective nozzle 1n, 2n, 3n, 4n and valve pin 1p, 2p, 3p, 4p that are interconnected to respective actuators 1a, 2a, 3a, 4a that can controllably drive the pins 1p, 2p, 3p, 4p reciprocally back and forth UD along the axes of the pins between gate closed and fully gate open positions.

As shown in FIG. 1, the cavity pressure sensors 1s, 2s, 3s, 4s are purposely positioned within the volume of the cavity 20, 20d at selected positions near enough, typically within about 0.1 to about 2 inches, a respective gate 1g, 2g, 3g, 4g that enables the sensors 1s, 2s, 3s, 4s to record a fluid pressure within the cavity that is indicative of the pressure or rate or flow or velocity of injection fluid that exits through a respective gate 1g, 2g, 3g, 4g into the cavity at about the position of the gate into the cavity 20, 20d.

As shown for example, prior to conducting a first injection cycle, a set of target fill or pack pressures or both fill and pack pressures are selected by the user or operator of the injection molding system 10. Then, a first injection cycle, Cycle 1, is carried out employing an injection pressure for injection of injection fluid from the injection machine 40 into the heated manifold 50 that is at least sufficient to ensure that a selected fill volume (typically 90% to 99%) of the cavity 20, 20d is filled with injection fluid within a selected period of preselected fill time, for example within 5 seconds or 8 seconds or 10 seconds, the amount of fill time being selected by the user of the apparatus based on the size and configuration of the mold cavity.

The pressure of injection fluid that is generated by the injection molding machine 40 (which is typically determined by the machine's 40 screw speed, screw size, screw configuration, barrel size, barrel and screw temperatures and barrel configuration) can be selected for use in Cycle 1 (or in any other cycle) by first calculating a most preferred injection molding machine 40 injection pressure by use of an algorithm that utilizes the three-dimensional volume and configuration of the mold cavity 20 and the user preselected preferred fill time of the mold cavity 20 as variables to calculate other system parameters such as injection machine pressure, nozzle channel pressure, cavity pressures in specific locations or positions within the volume of the known cavity configuration. Such an algorithm typically also utilizes as variables in calculating injection and cavity pressures, the mold 35 temperature and the melt temperature of the selected injection fluid material (for example the melt temperature of thermoplastic olefins (TPOs), polycarbonates, polyesters, polypropylene, polyurethanes, polyamides, or blends of these with, for instance, glass fibers, for strength and structural rigidity, or PET, polyethylene or the like).

During the course of any injection cycle, all of the valve pins 1p, 2p, 3p, 4p are initially closed at the start and are sequentially opened in time relative to each other. The first valve pin that is opened is preferably a more center located pin such as pin 2p or 3p, namely a valve pin that is associated with a gate 2g or 3g that is more centered toward the center of the mold cavity 20. The pins 1p, 4p whose gates 1g, 4g are disposed downstream of upstream gates 2g, 3g are typically not opened until the flow front of the injection fluid injected from the upstream gates 2g, 3g has travelled past the position of the downstream gate 1g, 4g thus minimizing or eliminating the occurrence of a weld line in the end result molded part or product.

During the course of the initial Cycle 1, the pressure of the injection fluid at the selected internal cavity positions of each cavity sensor 1s, 2s, 3s, 4s during the fill and pack portions of the duration of Cycle 1 are recorded. By way of example, if Cycle 1 were selected to be 8 seconds long, the fill portion might be the first 4-7 seconds and the pack portion might be the last 1-4 seconds.

With reference to FIG. 1, after such a Cycle 1 is carried out and the actual fill and pack pressures of 1100, 600 for N1 and 600, 600 for N2 and 600, 300 for N3 and 1100, 600 for N4 are recorded and input to the controller 16, a next subsequent second Cycle 2 is carried out, preferably automatically by controller 16, where the positions of the valve pins 1p, 2p, 3p, 4p are positioned and adjusted relative their positioning during Cycle 1 according to an algorithm contained in a controller 16 that establishes second axial positions for each of the valve pins (1p, 2p, 3p, 4p) relative to each of the respective gates (1g, 2g, 3g, 4g) that are determined according to the algorithm to effect an increase or decrease in the fill and pack pressures relative to the recorded fill and pack pressures that more closely approaches the selected target fill and pack pressures of 1000, 700 for N1, 500, 700 for N2, 500, 350 for N3 and 1000, 700 for N4.

Typically the algorithm is programmed to increase or decrease the fill and pack pressures on Cycle 2 by a predetermined fixed amount or degree.

At the conclusion of Cycle 2, a third Cycle 3 is carried out, preferably automatically by controller 16, in the same manner as Cycle 2 was carried out such that the resulting actual fill and pack pressures for each of the nozzles N1, N2, N3, N4 even more closely approaches the target pressures as compared to the actual pressures recorded in Cycle 2. Similarly as shown in FIG. 1, a fourth cycle, Cycle 4 is carried out such that the algorithm of the controller 16 directs an adjustment of the axial positioning of the valve pins (1p, 2p, 3p, 4p) such that the actual fill and pack pressures match the target fill and pack pressures for all nozzles N1, N2, N3, N4.

As shown by way of example in FIG. 1, in a typical single cavity large part mold 35, pressure of the injection fluid in the distal portion 20d of is generally lower than the pressure in the proximal 20p portion of the cavity 20 due to the location of the nozzles. Therefore as shown in FIG. 1, on carrying out Cycle 2 in order to more uniformly pack the volume of the cavity relative to the uniformity that was determined from the part or object produced in Cycle 1, the pack pressure in Cycle 2 is increased at the distal locations of sensors 1s and 4s by increasing the rate of flow of injection fluid through gates 1g and 4g relative to gates 2g and 3g during the pack pressure portion of the duration of Cycle 2.

The valve pins 1p, 2p, 3p, 4p and their associated actuators 1a, 2a, 3a, 4a and gates 1g, 2g, 3g, 4g are adapted and configured such that the velocity of flow of injection fluid through the gates can be variably controlled such that the pressure or velocity of flow of injection fluid through a corresponding gate progressively increases from zero to a selected maximum pressure or velocity (as occurs when a valve pin is in a fully gate open position) as a valve pin travels from the gate closed position to a selected upstream fully open position. Conversely each gate 1g, 2g, 3g, 4g and each corresponding valve pin 1p, 2p, 3p, 4p are adapted to enable the pressure or velocity of flow of injection fluid through a corresponding gate to progressively decrease from the maximum pressure or velocity to zero as a valve pin travels from the selected upstream fully open position to the gate closed position.

Figure 2:
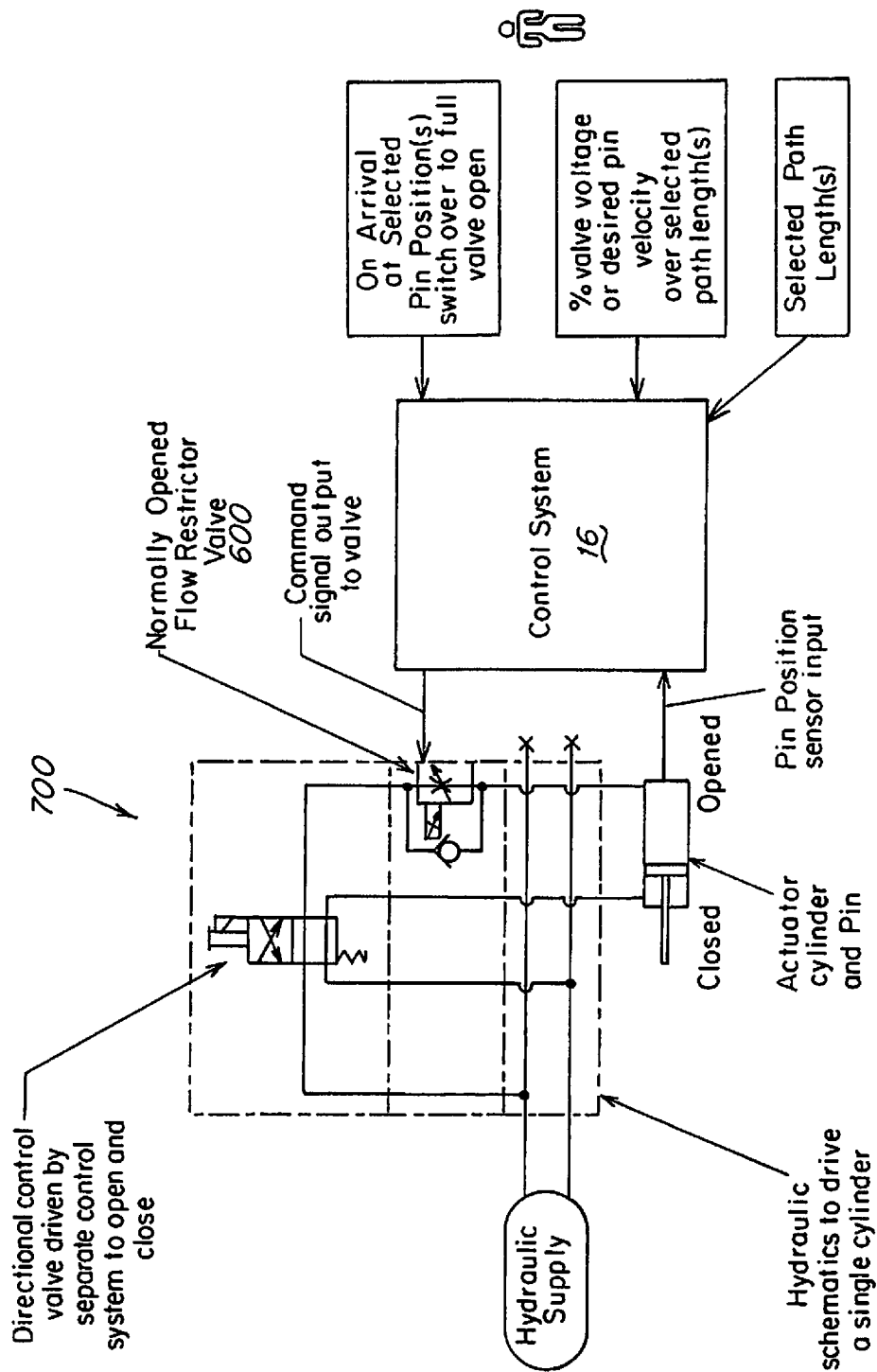
FIG. 2 is a schematic of one embodiment of the invention showing generically a hydraulically actuated valve pin in which at least one port of the actuator is connected to a flow restrictor so as to restrict the flow of hydraulic drive fluid and slow the opening of the valve pin by a selected lessening of pin opening velocity by use of a controller interconnected to the flow restrictor, the controller enabling the user to select a percentage of predetermined full open position velocity that the hydraulic drive supply to the actuator normally operates at full open velocity drive fluid pressure.
Figure 2A:
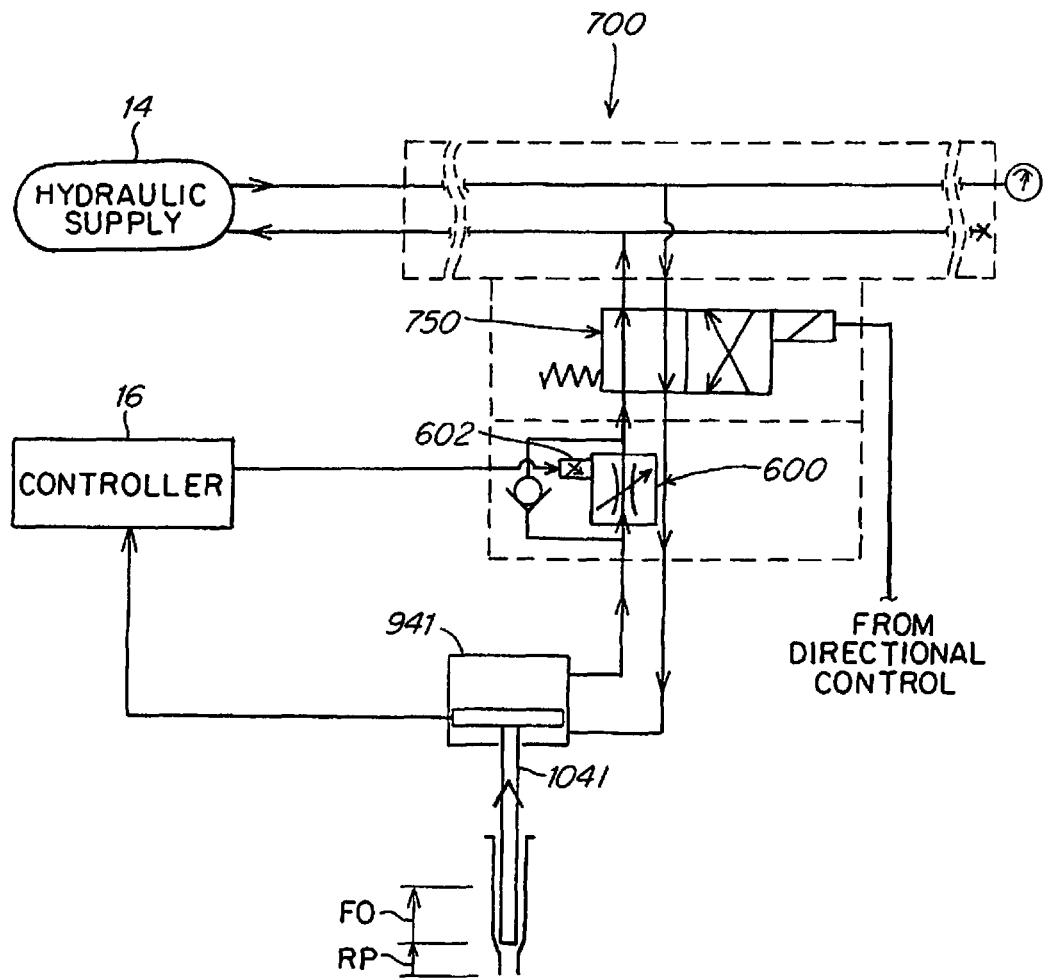
FIGS. 2A, 2B are schematic cross-sectional views of the hydraulic valves and restrictors used in the system of FIG. 1 according to the invention.
Figure 2B:
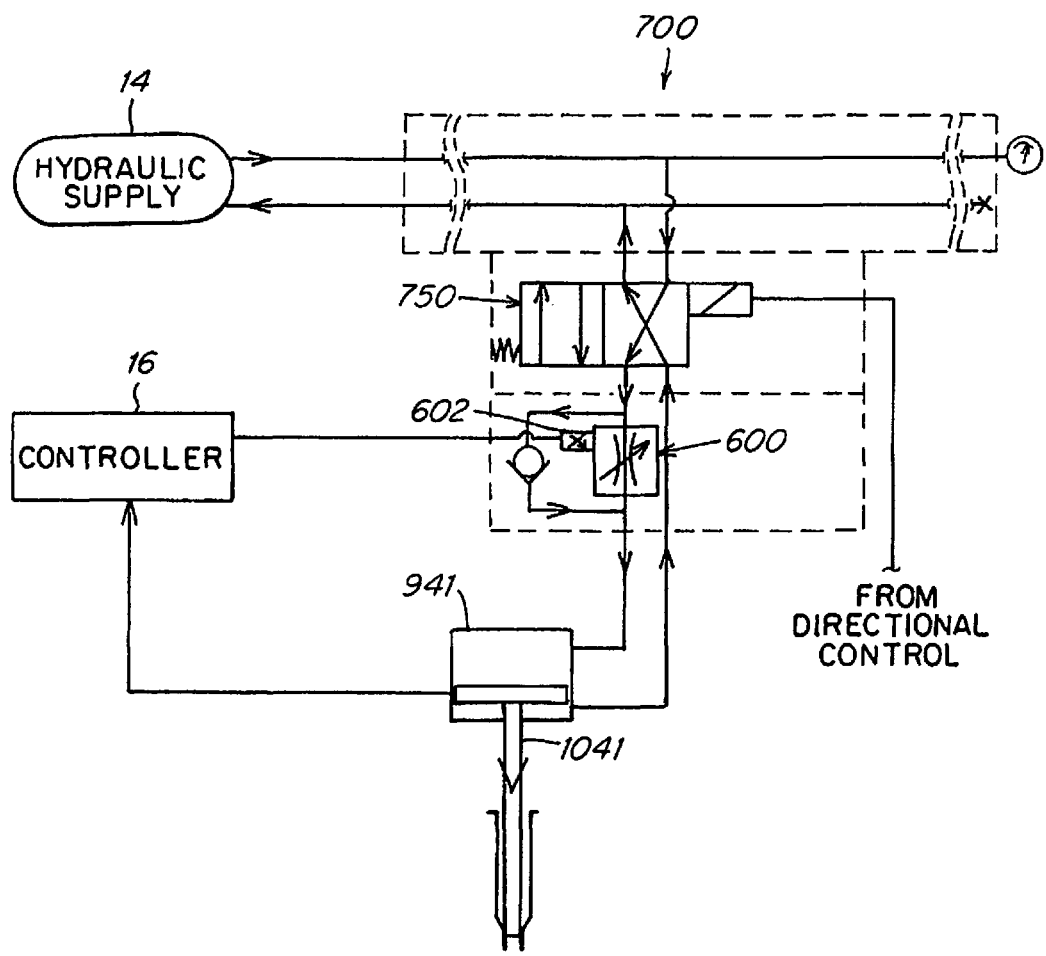

An example of an actuator system for driving any one or more of valve pins 1p, 2p, 3p, 4p is shown in FIGS. 2A, 2B. Valve pin 1041 corresponds to pins 1p, 2p, 3p, 4p and actuators correspond to actuators 1a, 2a, 3a, 4a of FIG. 1. As shown in FIGS. 2A, 2B, a supply of hydraulic fluid 14 is fed first through a directional control valve 750 mechanism that switches the hydraulic fluid flow to the actuator cylinders in either of two directions: fluid out to withdraw the pin upstream, FIG. 2A, and fluid in to drive the pin downstream, FIG. 2B. At the beginning of an injection cycle the gate of a lateral valve 34 is closed and the hydraulic system is in the directional configuration of FIG. 2B. When a cycle is started, the directional configuration of the directional valve 750 of the hydraulic system 700 is switched by controller 16 to the configuration of FIG. 2A. The hydraulic system includes a flow restriction valve 600 that can vary the rate of flow of hydraulic fluid to the actuator 941 under the control of the controller 16 to vary the rate of travel, upstream or downstream of the piston of the actuator 941 which in turn controls the direction and rate of travel of valve pin 1041. Although not shown in FIGS. 2A, 2B, the hydraulic system 700 controls the direction and rate of travel of the pistons of the actuators 941.

In one example, the user programs controller 16 via data inputs on a user interface to instruct the hydraulic system 700 to drive pins 1041 at an upstream velocity of travel that is reduced relative to a maximum velocity that the hydraulic system can drive the pins 1041 to travel. As described below, such reduced pin withdrawal rate or velocity is executed until a position sensor detects that an actuator 941 or an associated valve pin (or another component), has reached a certain position such as the end point COP, COP2, FIGS. 3B, 4B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds. In larger sized cavity systems, the times of withdrawal at reduced velocity and the entire injection cycle time can be greater such as between about 0.01 and 5 seconds and for reduced velocity withdrawal time and between about 0.5 and 20 seconds for entire cycle time.

In one embodiment, the user can select one or more of the valves, 1a-4a, 1p-4p, to act as a master valve(s) which is the first in time valve to be opened at the beginning of the injection cycle (where all of the valve pins are initially disposed at the start or beginning of the cycle in a gate closed position), the other valves 2a, 3a, 2p, 3p being disposed downstream of the selected master gate and opened later in time after the selected master valve is first opened.

The "fill phase" of an injection cycle is that portion of the injection cycle where one or more of the gates 1g-4g are opened and a selected percentage of between about 90% and about 99% of the volume of the cavity 20 is filled with the selected injection fluid.

Conversely, the "pack phase" of the injection cycle is that portion of an injection cycle where a selected portion of the remaining volume of the cavity of between about 1% and about 10% of the mold cavity that was not filled during the fill phase is still in process of being filled with injection fluid at the end of the injection cycle after the fill phase is complete, In such an embodiment the master valve is opened such that the master valve gate(s) is either first fully and then partially opened during the fill phase or is only partially opened during the entire fill phase the master valve gate(s) is next partially opened during the entire pack phase and subsequently closed at the end of the pack phase In such an embodiment, the downstream gate(s) that are downstream of the selected master gate(s) is or are opened after the flow front of injection fluid within the mold cavity reaches or travels to a selected position within the cavity 20 relative to the downstream gate(s), typically when the fluid flow front has travelled to a selected position downstream of the downstream gate. The downstream gate(s) is either first fully opened (where maximum velocity fluid flow occurs) and then partially opened (where reduced velocity fluid flow occurs) or is only partially opened during the entire fill phase, and then only partially opened during the entire pack phase.

Position sensors are typically used for sensing the position of the actuator cylinders and their associated valve pins and feed such position information to controller 16 for monitoring purposes. As shown, fluid material is injected from an injection machine into a manifold runner 50 and further downstream into the bores 44, 46 of the lateral nozzles and ultimately downstream through the gates 1g, 2g, 3g, 4g, 34. When the pins 1041 are withdrawn upstream to a position where the tip end of the pins 1041 are in a fully upstream open position, the rate of flow of fluid material through the gates 34 is at a maximum. However when the pins 1041 are initially withdrawn beginning from the closed gate position, FIGS. 3A, 4A, to intermediate upstream positions, FIGS. 3B, 4B a gap 1154 that restricts the velocity of fluid material flow is formed between the outer surfaces 1155 of the tip end of the pins 1041 and the inner surfaces 1254 of the gate areas of the nozzles. The restricted flow gap 1154 remains small enough to restrict and reduce the rate of flow of fluid material 1153 through gates 34 to a rate that is less than maximum flow velocity over a travel distance RP of the tip end of the pins 1041 going from closed to upstream as shown in FIGS. 1, 3B, and 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1041 opening and closing. The controller 16 controls the rate of travel, namely velocity of upstream travel, of a valve pin 1041 from its gate closed position for at least the predetermined amount of time that is selected to withdraw the pin at the selected reduced velocity rate.

The velocity of withdrawal of the valve pins 1041 is determined by regulation of the flow of hydraulic drive fluid that is pumped from a supply 14 to the actuators 941 through a flow restrictor valve 600, FIGS. 1, 2, 2A, 2B. When the flow restrictor valve 600 is completely open, namely 100% open, allowing maximum flow of the pressurized hydraulic fluid to the actuator cylinders, the valve pins 1041, 1042 are driven at a maximum upstream travel velocity. According to the invention, the degree of openness of the flow restrictor valve is adjusted in response to sensing of position of a suitable component such as an actuator 941 or associated valve pin to less than 100% open. Adjustment of the flow restrictor valve 600 to less than 100% open thus reduces the rate and volume flow of pressurized hydraulic fluid to the actuator cylinders thus in turn reducing the velocity of upstream travel of the pins 1041 for the selected period of time. At the end of the travel or length of path RP, RP2, a position sensor signals the controller 16, the controller 16 determines that the end COP, COP2 has been reached and the valve 600 is opened to a higher velocity, typically to its 100% open position to allow the actuator pistons and the valve pins 1041, 1042 to be driven at maximum upstream velocity FOV in order to reduce the cycle time of the injection cycle.

The valve 600 typically comprises a restrictor valve that is controllably positionable anywhere between completely closed (0% open) and completely open (100% open). Adjustment of the position of the restrictor valve 600 is typically accomplished via a source of electrical power that controllably drives an electromechanical mechanism that causes the valve to rotate such as a rotating spool that reacts to a magnetic or electromagnetic field created by the electrical signal output of the controller 16, namely an output of electrical energy, electrical power, voltage, current or amperage the degree or amount of which can be readily and controllably varied by conventional electrical output devices. The electro-mechanism is controllably drivable to cause the valve 600 to open or close to a degree of openness that is proportional to the amount or degree of electrical energy that is input to drive the electro-mechanism. The velocity of upstream withdrawal travel of the pins 1041 are in turn proportional to the degree of openness of the valve 600. Thus the rate of upstream travel of the pins 1041 is proportional to the amount or degree of electrical energy that is input to the electro-mechanism drives valves 600. The electro-mechanism that is selected for driving the valve 600 establishes in the first instance the maximum amount of electrical energy or power (such as voltage or current) that is required to open the valve to its 100% open position. A control for setting the amount or degree of electrical energy or power input to the motor is contained within the controller 16. Controller 16 includes an interface that enables the user to input any selected fraction or percentage of the maximum electrical energy or power needed to adjust the valve 600 to less than 100% open for beginning from the gate closed position of the valve pins 1041 and their associated actuators 941. Thus the user selects a reduced upstream velocity of the pins 1041 by inputting to the controller 16 a percentage of the maximum amount of electrical energy or power input (voltage or current) needed to open the valve 600 to 100% open. The user inputs such selections into the controller 16. The user also selects the length of the path of travel RP, RP2 of the valve pin or the position of the valve pin or other component over the course of travel of which the valve 600 is to be maintained partially open and inputs such selections into the controller 16. The controller 16 includes conventional programming or circuitry that receives and executes the user inputs. The controller may include programming or circuitry that enables the user to input as a variable a selected pin velocity rather than a percentage of electrical output, the programming of the controller 16 automatically converting the inputs by the user to appropriate instructions for reduced energy input to the electro-mechanism that drives the valve 600.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041 are drivable by the hydraulic system. The actual maximum velocity at which the actuators 941 and their associated pins 1041 are driven is predetermined by selection of the size and configuration of the actuators 941, the size and configuration of the restriction valve 600 and the degree of pressurization and type of hydraulic drive fluid selected for use by the user. The maximum drive rate of the hydraulic system is predetermined by the manufacturer and the user of the system and is typically selected according to the application, size and nature of the mold and the injection molded part to be fabricated.

As shown by the series of examples of programs illustrated in FIGS. 5A-5D one or more reduced pin velocities can be selected and the pin driven by restricted hydraulic fluid flow (or by reduced velocity drive by an electric actuator) between the gate closed (X and Y axis zero position) and the final intermediate upstream open gate position (4 mm for example in the FIG. 5A example, 5 mm in the FIG. 5B example) at which point the controller 16 in response to position sensing instructs the drive system to drive pin 1041 to travel upstream at a higher, typically maximum, upstream travel velocity (as shown, 100 mm/sec in the FIGS. 5A-5D examples). In the FIG. 5A example, the reduced pin velocity is selected as 50 mm/sec. In practice the actual velocity of the pin may or may not be precisely known, the Y velocity axis corresponding (and generally being proportional) to the degree of electrical energy input to the motor that controls the opening of the flow restriction valve, 100 mm/sec corresponding to the valve 600 being completely 100% open (and pin being driven at maximum velocity); and 50 mm/sec corresponding to 50% electrical energy input to the electromechanism that drives the restriction valve 600 to one-half of its maximum 100% degree of openness. In the FIG. 5A example, the path length RP over which the valve pin 1041 travels at the reduced 50 mm/sec velocity is 4 mm. After the pin 1041 has been driven to the upstream position COP position of about 4 mm from the gate closed GC position, the controller 16 instructs the electromechanism that drives the valve 600 (typically a magnetic or electromagnetic field driven device such as a spool) to open the restrictor valve 600 to full 100% open at which time the pin (and its associated actuator piston) are driven by the hydraulic system at the maximum travel rate 100 mm/sec for the predetermined, given pressurized hydraulic system.

Figure 5A:
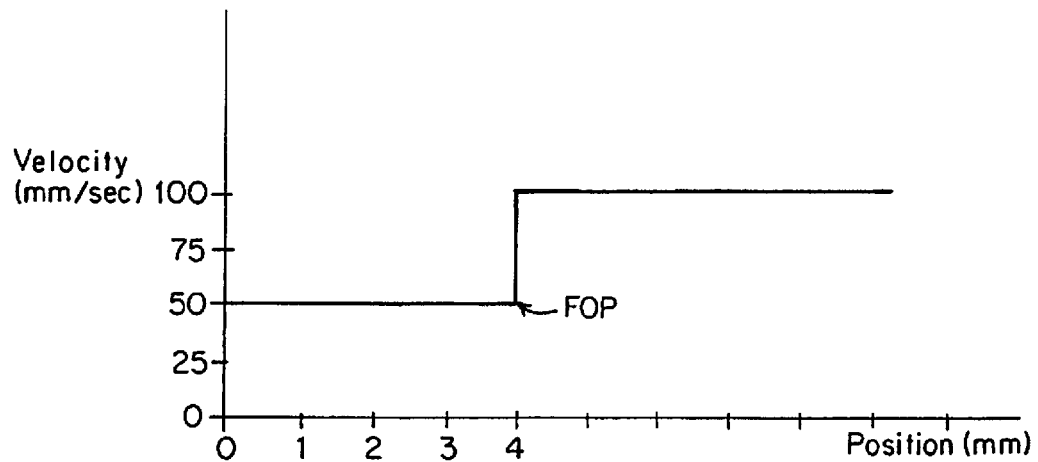
FIGS. 5A-5D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.
Figure 5B:
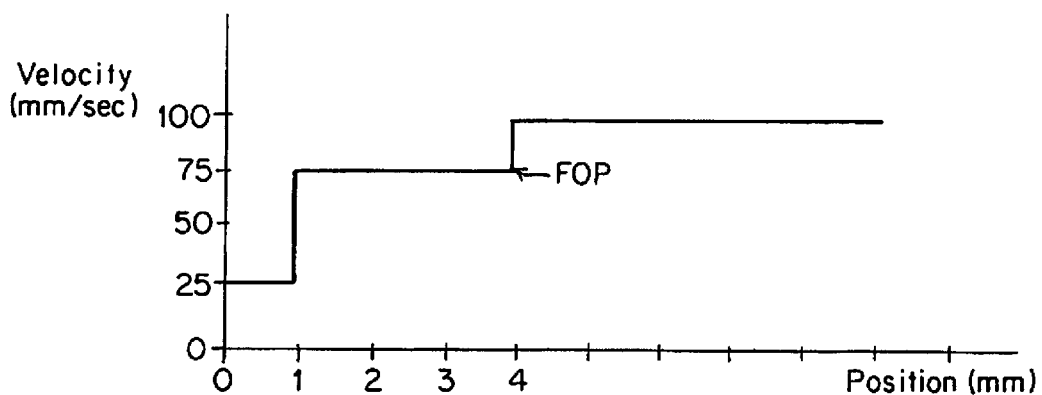
Figure 5C:
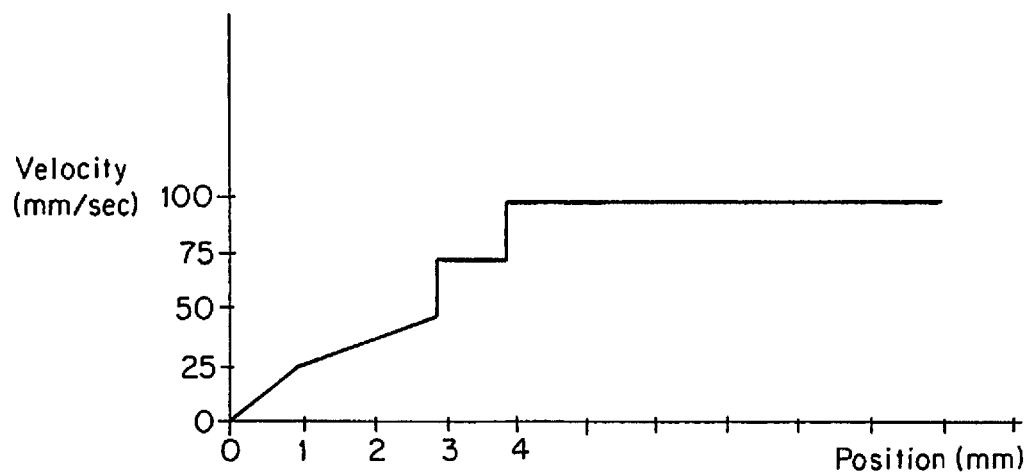
Figure 5D:
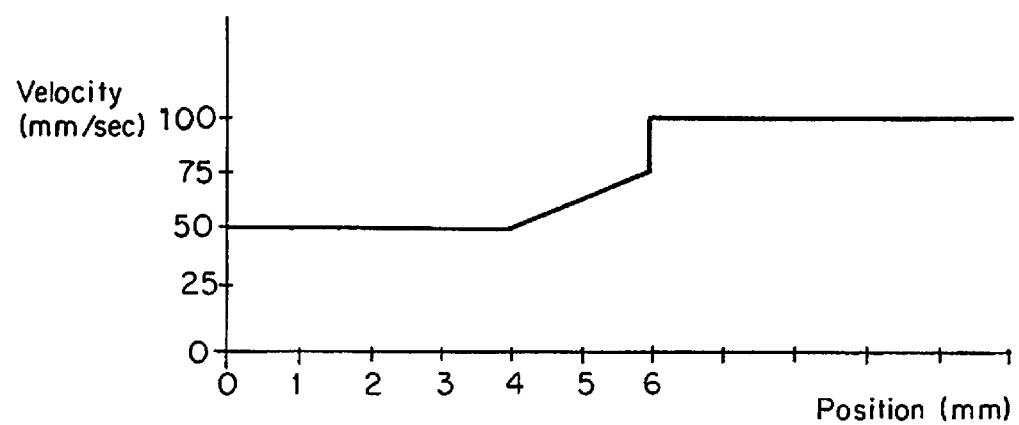

FIGS. 5B-5D illustrate a variety of alternative examples for driving the pin 1041 at reduced velocities for various durations of time. For example as shown in FIG. 5B, the pin is driven for 0.02 seconds at 25 mm/sec, then for 0.06 seconds at 75 mm/sec and then allowed to go to full valve open velocity shown as 100 mm/sec. Full valve open or maximum velocity is typically determined by the nature of hydraulic (or pneumatic) valve or motor drive system that drives the valve pin. In the case of a hydraulic (or pneumatic) system the maximum velocity that the system is capable of implementing is determined by the nature, design and size of the pumps, the fluid delivery channels, the actuator, the drive fluid (liquid or gas), the restrictor valves and the like.

As shown in FIGS. 5A-5D, the velocity of the valve pin when the pin reaches the end of the reduced velocity period, the valve 600 can be instructed to assume the full open position essentially instantaneously or alternatively can be instructed to take a more gradual approach up, between 0.08 and 0.12 seconds, to the maximum valve openness as shown in FIG. 5D. In all cases the controller 16 instructs the valve pin 1041 to travel continuously upstream rather than follow a profile where the pin might travel in a downstream direction during the course of the injection cycle. Most preferably, the actuator, valve pin, valves and fluid drive system are adapted to move the valve pin between a gate closed position and a maximum upstream travel position that defines an end of stroke position for the actuator and the valve pin. Most preferably the valve pin is moved at the maximum velocity at one or more times or positions over the course of upstream travel of the valve pin past the upstream gate open position. Alternatively to the hydraulic system depicted and described, a pneumatic or gas driven system can be used and implemented in the same manner as described above for a hydraulic system.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041 is at a full gate open position, namely when the tip end 1142 of the pin 1041 has travelled to or beyond the length of the restricted flow path RP (which is, for example the 4 mm upstream travel position of FIGS. 5A-5C).

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 5A-5D, where the pin is no longer restricting flow of injection mold material through the gate. In such an embodiment, at the expiration of the predetermined amount of time when the pin tip 1142 reaches the FOP (full open) position FIGS. 5A, 5B, the pin 1041 is immediately driven by the hydraulic system at maximum velocity FOV (full open velocity) typically such that the restriction valve 600 is opened to full 100% open.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

In the FIGS. 5A-5D examples, FOV is 100 mm/sec. Typically, when the time period for driving the pin 1041 at reduced velocity has expired and the pin tip 1142 has reached the position COP, COP2, the restriction valve 600 is opened to full 100% open velocity FOV position such that the pins 1041 are driven at the maximum velocity or rate of travel that the hydraulic system is capable of driving the actuators 941. Alternatively, the pins 1041 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041 ranges from about 8 mm to about 18 inches upstream from the closed gate position GC.

The controller 16 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

What is claimed is:

1. A method for establishing pack and fill pressures of an injection fluid injected in an injection molding system (10) during pack and fill phases at preselected positions within a cavity (20) of a mold (35) wherein the injection molding system (10) is comprised of an injection molding machine (40), a heated manifold (50) into which the injection molding machine injects a selected injection fluid (1153), a plurality of nozzles (1n, 2n, 3n, 4n) receiving injection fluid (1153) from the heated manifold (50), the nozzles each having a respective gate (1g, 2g, 3g, 4g) communicating with one or more cavities (20) of the mold (35), each nozzle having a valve comprised of an actuator (1a, 2a, 3a, 4a) and a corresponding valve pin (1p, 2p, 3p, 4p) controllably driven by the actuator to control velocity or pressure of injection fluid flow (1153) through the gates of the nozzles during an injection cycle having a selected duration, the injection cycle comprising a fill phase wherein between about 90% and about 99% of the mold cavity is filled with injection fluid and a subsequent pack phase wherein between about 1% and about 10% of the mold cavity is filled with injection fluid, the method comprising:
selecting a target fill and pack pressure at each of the preselected positions,
injecting injection fluid (1153) on a first injection cycle through each of the gates (1g, 2g, 3g, 4g) of each of the nozzles (1n, 2n, 3n, 4n) with the corresponding valve pins (1p, 2p, 3p, 4p) each being positioned at corresponding first selected axial positions relative to each of the gates,
recording the pack and fill pressures at each of the selected positions within the one or more mold cavities during the first injection cycle,
establishing second axial positions for each of the valve pins (1p, 2p, 3p, 4p) relative to each of the respective gates (1g, 2g, 3g, 4g) that are determined according to an algorithm that determines an adjustment in the axial positioning of each of the valve pins relative to their respective gates that will effect an increase or decrease in the fill and pack pressures relative to the recorded fill and pack pressures that more closely approaches the selected target fill and pack pressures, injecting injection fluid (1153) on a successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the second axial positions for each of the valve pins that are determined according to the algorithm such that pressure or velocity of flow of injection fluid through the gates is adjusted to more closely approach the target fill and pack pressures for each of the selected positions within the one or more mold cavities (20).

2. A method according to claim 1 wherein the algorithm determines the adjustment in axial positioning of the valve pins according to a program that increases or decreases the fill and pack pressures to a preselected degree of increase or decrease.

3. A method according to claim 1 wherein at least the steps of establishing and injecting are controlled and executed automatically by a programmable controller that contains instructions for executing the algorithm.

4. A method according to claim 1 further comprising:
recording the pack and fill pressures at each of the selected positions within the one or more mold cavities during the last or latest conducted injection cycle,
establishing one or more additional selected axial positions for each of the valve pins (1p, 2p, 3p, 4p) relative to each of the respective gates (1g, 2g, 3g, 4g) that are determined according to the algorithm that determines an adjustment in the axial positioning of each of the valve pins relative to their respective gates that will effect an increase or decrease in the fill and pack pressures relative to the last or latest recorded fill and pack pressures that more closely approaches the selected target fill and pack pressures,
injecting injection fluid (1153) on another successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the one or more additional selected axial positions for each of the valve pins that are determined according to the algorithm such that pressure or velocity of flow of injection fluid through the gates is again adjusted to more closely approach the target fill and pack pressures for each of the selected positions within the one or more mold cavities (20),
repeating the steps of recording, establishing and injecting until the selected target pressures are achieved via the repeating.

5. A method according to claim 1 wherein:
the actuators, valve pins and gates are adapted such that the valve pins are controllably drivable between a gate closed position at which injection fluid flow is stopped and pressure is zero at the gate, a fully upstream gate open position at which injection fluid flow is at a maximum velocity and pressure and one or more intermediate upstream positions between the gate closed and fully upstream gate open position at which injection fluid flow pressure and velocity is between zero and the maximum,
the pressure or velocity of injection fluid flow through the gates being adjusted during one or more of the successive injection cycles by controlling positioning of a distal end of one or more valve pins relative to an interior surface of a corresponding gate to controllably reduce velocity of flow of the injection fluid to one or more reduced velocities between zero and the maximum velocity.

6. A method according to claim 1 wherein one or more of the valve pins is withdrawn and maintained in at least one selected intermediate upstream position for a selected portion or all of the duration of the injection cycle.

7. A method according to claim 1 wherein one or more of the valve pins is withdrawn and maintained in at least one selected intermediate upstream position for a selected portion or all of the fill and pack phases of the injection cycle.

8. A method for establishing fill pressures of an injection fluid injected in an injection molding system (10) during fill phases at preselected positions within a cavity (20) of a mold (35) wherein the injection molding system (10) is comprised of an injection molding machine (40), a heated manifold (50) into which the injection molding machine injects a selected injection fluid (1153), a plurality of nozzles (1n, 2n, 3n, 4n) receiving injection fluid (1153) from the heated manifold (50), the nozzles each having a respective gate (1g, 2g, 3g, 4g) communicating with one or more cavities (20) of the mold (35), each nozzle having a valve comprised of an actuator (1a, 2a, 3a, 4a) and a corresponding valve pin (1p, 2p, 3p, 4p) controllably driven by the actuator to control velocity or pressure of injection fluid flow (1153) through the gates of the nozzles during an injection cycle having a selected duration, the injection cycle comprising a fill phase wherein between about 90% and about 99% of the mold cavity is filled with injection fluid and a subsequent pack phase wherein between about 1% and about 10% of the mold cavity is filled with injection fluid,
the method comprising:
selecting a target fill pressure at each of the preselected positions,
injecting injection fluid (1153) on a first injection cycle through each of the gates (1g, 2g, 3g, 4g) of each of the nozzles (1n, 2n, 3n, 4n) with the corresponding valve pins (1p, 2p, 3p, 4p) each being positioned at corresponding first selected axial positions relative to each of the gates,
recording the fill pressures at each of the selected positions within the one or more mold cavities during the first injection cycle,
establishing second axial positions for each of the valve pins (1p, 2p, 3p, 4p) relative to each of the respective gates (1g, 2g, 3g, 4g) that are determined according to an algorithm that determines an adjustment in the axial positioning of each of the valve pins relative to their respective gates that will effect an increase or decrease in the fill pressures relative to the recorded fill pressures that more closely approaches the selected target fill pressures,
injecting injection fluid (1153) on a successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the second axial positions for each of the valve pins that are determined according to the algorithm such that pressure or velocity of flow of injection fluid through the gates is adjusted to more closely approach the target fill pressures for each of the selected positions within the one or more mold cavities (20).

9. A method according to claim 8 wherein the algorithm determines the adjustment in axial positioning of the valve pins according to a program that increases or decreases the fill pressures to a preselected degree of increase or decrease.

10. A method according to claim 8 wherein at least the steps of establishing and injecting are controlled and executed automatically by a programmable controller that contains instructions for executing the algorithm.

11. A method according to claim 8 further comprising:
recording the fill pressures at each of the selected positions within the one or more mold cavities during the last or latest conducted injection cycle,
establishing one or more additional selected axial positions for each of the valve pins (1p, 2p, 3p, 4p) relative to each of the respective gates (1g, 2g, 3g, 4g) that are determined according to the algorithm that determines an adjustment in the axial positioning of each of the valve pins relative to their respective gates that will effect an increase or decrease in the fill pressures relative to the last or latest recorded fill pressures that more closely approaches the selected target fill pressures,
injecting injection fluid (1153) on another successive injection cycle through each of the gates and controlling the actuators (1a, 2a, 3a, 4a) corresponding to each gate (1g, 2g, 3g, 4g) to adjust positioning of the valve pins (1p, 2p, 3p, 4p) to the one or more additional selected axial positions for each of the valve pins that are determined according to the algorithm such that pressure or velocity of flow of injection fluid through the gates is again adjusted to more closely approach the target fill pressures for each of the selected positions within the one or more mold cavities (20),
repeating the steps of recording, establishing and injecting until the selected target pressures are achieved.

12. A method according to claim 8 wherein:
the actuators, valve pins and gates are adapted such that the valve pins are controllably drivable between a gate closed position at which injection fluid flow is stopped and pressure is zero at the gate, a fully upstream gate open position at which injection fluid flow is at a maximum velocity and pressure and one or more intermediate upstream positions between the gate closed and fully upstream gate open position at which injection fluid flow pressure and velocity is between zero and the maximum,
the pressure or velocity of injection fluid flow through the gates being adjusted during one or more of the successive injection cycles by controlling positioning of a distal end of one or more valve pins relative to an interior surface of a corresponding gate to controllably reduce velocity of flow of the injection fluid to one or more reduced velocities between zero and the maximum velocity.

13. A method according to claim 8 wherein one or more of the valve pins is withdrawn and maintained in at least one selected intermediate upstream position for a selected portion or all of the duration of the injection cycle.

14. A method according to claim 8 wherein one or more of the valve pins is withdrawn and maintained in at least one selected intermediate upstream position for a selected portion or all of the fill phases of the injection cycle.

* * * * *